United States Patent [19]

Cruz, Jr.

[11] Patent Number: 4,515,633

[45] Date of Patent: May 7, 1985

[54] POLYMERIC MATERIALS COMBINED WITH MODIFIED HYDRATED MAGNESIUM ALUMINOSILICATES

[75] Inventor: Mamerto M. Cruz, Jr., Pennington, N.J.

[73] Assignee: Morca, Inc., Pennington, N.J.

[21] Appl. No.: 507,723

[22] Filed: Jun. 27, 1983

Related U.S. Application Data

[63] Continuation-in-part of Ser. No. 196,308, Oct. 14, 1980, Pat. No. 4,400,297.

[51] Int. Cl.$^3$ .................... C09D 5/16; C08L 89/00; C08L 1/00
[52] U.S. Cl. ............... 106/18.26; 106/18.28; 106/122; 106/124; 106/137; 106/204; 106/288 B; 162/159; 106/18.13
[58] Field of Search ............. 524/444; 162/181.7, 162/159; 106/122, 18.13, 18.26, 18.28, 137, 204, 124

[56] References Cited

U.S. PATENT DOCUMENTS

| | | | |
|---|---|---|---|
| 1,977,874 | 10/1934 | Denning | 106/122 |
| 1,987,221 | 1/1935 | Stroehlke | 423/111 |
| 2,108,761 | 2/1938 | Becher | 162/181.7 |
| 2,366,217 | 1/1945 | Ruthruff | 252/378 |
| 2,935,471 | 5/1960 | Aarons | 106/18.13 |
| 3,325,340 | 6/1967 | Walker | 252/378 |
| 3,390,045 | 6/1968 | Miller | 264/110 |
| 3,531,410 | 9/1970 | Taylor | 252/28 |
| 3,813,346 | 5/1974 | Wada et al. | 252/378 |
| 4,043,862 | 8/1977 | Roberts | 162/181.7 |
| 4,400,297 | 8/1983 | Cruz | 252/378 |

FOREIGN PATENT DOCUMENTS

| | | | |
|---|---|---|---|
| 755551 | 8/1956 | United Kingdom | 106/18.13 |
| 819190 | 9/1959 | United Kingdom | 106/18.13 |

*Primary Examiner*—Theodore Morris
*Attorney, Agent, or Firm*—George F. Mueller

[57] ABSTRACT

Polymeric materials are combined with modified heat exfoliated hydrated magnesium aluminosilicates. The aluminosilicates are treated with aqueous acidic solutions and subjected to controlled agitation to convert highly porous concertina-shaped granular hydrated magnesium aluminosilicates into groups of electrolyte insensitive platelets. Water slurries of the groups of platelets when dried form coherent, continuous sheets which when mechanically disintegrated may be reslurried in water. The modified heat exfoliated magnesium aluminosilicates are adapted for use in fire retardant, loose fill cellulose insulation, paper and pulp products, synthetic polymeric materials, coatings such as fire retardant acoustic coatings, dog foods, defoliants and the like.

20 Claims, No Drawings

POLYMERIC MATERIALS COMBINED WITH MODIFIED HYDRATED MAGNESIUM ALUMINOSILICATES

This application is a continuation-in-part of application Ser. No. 196,308, filed Oct. 14, 1980, now U.S. Pat. No. 4,400,297.

This invention relates to a method for preparing a novel form of modified layered, lattice structured naturally occurring hydrated magnesium aluminosilicate minerals like montmorillonites, particularly exemplified by vermiculite, and to products containing the modified minerals.

Montmorillonites such as vermiculite occur in nature as a hydrated magnesium aluminosilicate mineral characterized by a layered, lattice structure similar in physical form to the micas. The silicate layers are negatively charged, but electrically neutralized by the calcium and magnesium cations between the silicate layers. The interlayer cations are held loosely and the spaced between the layers is accessible to water. The natural vermiculite may be ground to any desired particle size, however, this type of mechanical treatment does not separate the mineral into groups of platelets. The finely divided material produced by mechanical disintegration when dispersed in water and the dispersion of slurry spread on a supporting structure does not form a self supporting sheet upon drying the dispersion or slurry.

For many uses, the naturally occurring hydrated magnesium aluminosilicate mineral is heat exfoliated, that is, heated rapidly to elevated temperatures such as about 450° C. This heat treatment converts contained moisture into steam which expands the mineral granules into concertina-shaped granules. This exfoliation results in the formation of pores between groups of platelets and thus reduces the bulk density. In this form, the vermiculite finds use as a carrier, absorbent, soil conditioner, packing material, sound absorbing material, loose fill heat insulator, bulking agent in animal feeds and the like. The significant advantage of this naturally occurring mineral, as well as the exfoliated material, is that it is non-toxic and non-carcinogenic.

In accordance with the present invention, heat exfoliated magnesium aluminosilicate minerals are subjected to treatment with an aqueous acidic solution having a pH of about 1 to about 5.5 and subjecting the mass to a controlled mild or medium shearing action for a brief period. In general, the shearing action is controlled so that about 5 to 10%, by weight, of the mineral particles exhibit a Tyndall effect although for some specific purposes the amount of the mineral particles exhibiting the Tyndall effect may be up to about 20%. The acidic treatment results in the removal of some of the interlayer cations, particularly magnesium, and effects a higher degree of hydration of the layered lattic structure of the concertina-shaped, heat exfoliated vermiculite granules. The shearing action in the aqueous slurry separates the granules into groups of platelets. This action (chemical plus mechanical) greatly reduces or destroys the bulking characteristic of the concertina-shaped structure. It is essential to preserve the groups of platelets. In this state the slurry of groups of platelets when applied to a supporting surface and allowed to dry will form a self supporting coherent sheet. Furthermore, a distinguishable characteristic of the slurried particles is that they are insensitive to flocculation by acids, alkalies and other electrolytes. The production of such slurries is an essential element of this chemical-mechanical treatment of non-heat expanded vermiculite does not produce slurries possessing these properties.

It is believed that the aqueous acidic treatment penetrates the larger voids of the concertina-shaped granules permitting the shearing action to cleave or separate the granules into groups of platelets and thus destroys the concertina-shaped structure. The aqueous acidic treatment results in a partial removal of the inter-layer magnesium and possibly some calcium. The amount of these removed cations will be dependent upon the pH of the aqueous acidic solution. The acidity of the solution must not be so severe so as to totally remove the magnesium and calcium because such action results in a product consisting essentially of silica.

The aqueous acidic solution may be formed from organic acids, inorganic acids and acid salts, such as, for example, acetic, lactic, cyanoacetic, citric, boric, hydrochloric, phosphoric, sulfuric and sulfurous acids, sodium acid phthalate, sodium acid phosphate, sodium acid sulfite and the like. The requirement for the acid or acid salt is that it is capable of forming an aqueous solution of a pH between about 1 and about 5.5. A surfactant may be added to the acidic solution so as to improve the wettability of the substrate, but such addition is entirely optional.

Following the slurrying of the granular exfoliated vermiculite in the acidic solution and the mild shearing action, the slurry may or may not be filtered and washed with water so as to remove the acid depending upon the specific application of the modified vermiculite. Whether washed acid free or whether the particles are wet with the acidic liquid, either in a slurry state or filtered to remove excess liquid, the mass is air dried or dried in an air circulating oven at 110° C. The dried filter cake or dried sheet formed from a slurry may be readily fluffed without a detrimental effect on the reslurrying characteristics to reproduce a homogeneous slurry.

The mild shearing action may be effected conveniently by the use of a shear type beater such as a Waring blendor with dull blades. The shearing action should be controlled so that a minimum of particles are formed which exhibit a Tyndall effect. The shearing action may be performed on slurries containing up to about 40% solids, by weight. In the use of a Waring-type blendor, the slurry may contain up to about 25% solids, while the use of a disk mill or a refiner or a Cowles disintegrator allows the solids content to be up to about 40%. A characteristic of the slurries is that when diluted to a solids content of from about 2 to 5%, the dilute slurries exhibit a pearlescent appearance so long as the slurry is subjected to mild agitation or mild turbulence. This characteristic is exhibited by the chemically-mechanically treated material as well as the dried material upon reslurrying in water. Like treatment of crude or non-heat exfoliated vermiculite doess not exhibit the pearlescent appearance in similarly diluted slurries.

The modified, heat-exfoliated vermiculite is in particulate form and consists of groups of non-colloidal platelets that are capable of hydrogen bonding with hydrophilic materials and are compatible with hydrophobic polymers. This modified vermiculite forms slurries in aqueous media which slurries are non-sensitive to added electrolytes such as acids, alkalies and salts. The slurries when dried in contact with a surface of hydrophobic polymer form coherent, continuous sheets which may be separated intact from the polymer surface.

EXAMPLE 1

Twenty grams of coarse granules (4–9 lbs. per cu. ft.) of heat exfoliated vermiculite were added to 380 mls. of tap water adjusted to a pH of 2–3 by the addition of hydrochloric acid. The mixture was immediately subjected to a mild shearing action in a Waring blendor with dull blades operated at medium speed for 2–3 minutes at room temperature. A uniform slurry was formed which exhibited a pearlescent appearance. A portion of the slurry was transferred to a test tube and diluted to form a slurry containing about 2% solids. As the test tube was rocked manually the slurry exhibited a pearlescent appearance.

The remaining slurry was filtered and washed with water to a pH of 6–7. A portion of the filter cake was dried in air at room temperature. A portion of the dried cake was crumbled manually and the other portion fluffed in a laboratory dry blendor. The crumbled and fluffed materials when added to water and stirred formed homogeneous slurries exhibiting the characteristic pearlescent appearance.

Another portion of the washed filter cake was slurried in water to form a slurry containing about 10% solids. The slurry was poured into a shallow polypropylene tray and dried at room temperature. The dried material was in the form of a continuous, self-supporting sheet which was removed intact from the tray. A portion of the sheet was crumbled manually and a portion was fluffed in a laboratory model dry blendor. Both materials formed characteristic slurries when placed in water in jars and the jars shaken manually.

Like results were obtained when boric acid, phosphoric acid and acetic acid were substituted for the hydrochloric acid in amounts to provide solutions having a pH of 2–3. All slurries as formed and diluted to solids content of 3 to 5% exhibited the evanescent or temporary pearlescent appearance.

Crude, non-heat exfoliated vermiculite treated with hydrochloric acid solution having a pH of 2–3 and subjected to the above described shearing action and subjected to a shearing action for 5–6 minutes did not produce slurries exhibiting the pearlescent appearance. Drying of a slurry of the untreated vermiculite did not form self-supporting sheets.

Heat exfoliated vermiculite treated in accordance with the present method exhibits a sedimentation behavior differing from that of non-heat exfoliated vermiculite and that of heat exfoliated vermiculite merely subjected to slurrying in water and subjected to the mild shearing action. The sedimentation behavior may be used as an uncomplicated, simple procedure for establishing the requisite shearing action to produce the separated macroscopic groups of platelets.

EXAMPLE 2

Ten grams of coarse granules of heat exfoliated vermiculite were added to 200 mls. of tap water adjusted to a pH of about 2.5 by the addition of hydrochloric acid. The mass was subjected to a mild shearing action in a Waring blendor with dull blades operated at medium speed for about 2.5 minutes at room temperature. The slurry produced was filtered, washed free of acid and salts and the filter cake spread on a polypropylene tray and dried in air at room temperature. The dried material was identified as Sample A.

In like manner 10 grams of coarse granules of heat exfoliated vermiculite were added to 200 mls. of tap water and the mass subjected to a mild shearing action in a Waring blendor, dull blades, medium speed for about 2.5 minutes at room temperature. The slurry produced was filtered and the filter cake dried in air at room temperature. The dried material was identified as Sample B.

Similarly, 10 grams of coarse granules of vermiculite ore (unexfoliated) were added to 200 mls. of tap water adjusted to a pH of about 2.5 by the addition of hydrochloric acid in a Waring blendor jar. The mass was subjected to a mild shearing action, dull blades, medium speed, for about 2.5 minutes at room temperature. The resulting slurry was filtered, the filter cake washed free of acid and salts and dried in air at room temperature. The dried material was identified as Sample C.

Slurries of each of Samples A, B and C were formed by adding 2 grams of each of the samples to 200 ml. portions of water in the Waring blendor. The blendor was in each instance operated at medium speed for about 0.5 minutes. Each slurry was diluted to 250 mls. and immediately transferred to a 250 ml. graduated cylinder and allowed to stand for 21 hours at room temperature.

Observations of the slurries were made at the end of 6, 12 and 21 hours. The volumes of Residue (settled material), Turbid liquid and Clear liquid were noted and were as reported in Table I.

TABLE I

| Period (hours) | 0 | 6 | 12 | 21 |
|---|---|---|---|---|
| Sample A | | | | |
| Residue (ml.) | 0 | 15 | 18 | 18 |
| Turbid liquid (ml.) | 250 | 233 | 222 | 221 |
| Clear liquid | 0 | 2 | 10 | 21 |
| Sample B | | | | |
| Residue (ml.) | 0 | 28 | 26 | 26 |
| Turbid liquid (ml.) | 250 | 221 | 219 | 219 |
| Clear liquid (ml.) | 0 | 1 | 5 | 5 |
| Sample C | | | | |
| Residue (ml.) | 0 | 4 | 6 | 6 |
| Turbid liquid (ml.) | 250 | 0 | 0 | 0 |
| Clear liquid (ml.) | 0 | 246 | 244 | 244 |

It is apparent that when each slurry is transferred to the graduated cylinder the entire liquid is turbid. In determining the turbidity after 6 hours, a light beam was passed at a right angle to the line of sight. Such observation indicated particles exhibiting a Tyndall effect. The light source was then placed behind the cylinder so that the light beam passed in the line of sight.

In the case of Sample A, after 6 hours the major portion of the liquid was turbid, exhibiting a Tyndall effect and the light source was not visible when placed behind the cylinder. The top clear liquid did not contain particles exhibiting a Tyndall effect.

After the 21 hour period, the clear liquid was removed carefully by means of a syringe and discarded. The turbid liquid containing particles exhibiting a Tyndall effect was removed by the use of a syringe and transferred to a polypropylene tray and allowed to dry in air at room temperature. The dried material obtained was weighed. The remaining liquid covering the settlings and settlings were likewise transferred to a propylene tray and dried. The dried settlings were weighed. The weight of the material exhibiting a Tyndall effect was 0.10 gm. equivalent to about 5% of the original sample. The weight of the settlings was 1.88 gms. equivalent to 94% of the original sample. A loss in weight amounted to 0.02 gm. or 1% of the original sample.

In the case of Sample B, after 6 hours the major portion of the liquid, recorded as "Turbid liquid", exhibited a hazy appearance and exhibited a Tyndall effect. When the light source was placed behind the cylinder, after 6, 12 and 21 hours, the filament of the light bulb was distinctly visible. The clear liquid at the top did not contain particles exhibiting a Tyndall effect.

In the case of Sample C, after 6 hours the major portion of the liquid was almost clear and exhibited a vey slight Tyndall effect. At the end of the 21 hour period, the major portion of the liquid was clear and no Tyndall effect was noticeable. When the light source was placed behind the cylinder after 6, 12 and 21 hours the filament of the light bulk was distinctly visible.

In the foregoing example, the treatment of the vermiculite samples was at ambient temperatures. Higher and lower temperatures are satisfactory. Preferably, normal ambient temperatures are utilized because of better control of the reaction and no energy is required to heat or cool the mass being treated.

The modified heat exfoliated vermiculite as prepared by the present method, like the vermiculite per se, possesses excellent electrical insulating properties. This modified form of vermiculite is highly compatible with paper making pulps. Electrical insulating paper is produced from highly hydrated, unbleached kraft pulp. The electrical insulating property of such paper may be improved without an adverse affect on the flexibility of the paper by incorporating as high as 100% of the modified vermiculite, based on the weight of the pulp, into the paper. The pliability and flexibility of such paper is sufficient to render the paper suitable as a cable wrapping and for similar applications.

The chemically-mechanically modified vermiculite produced as described may be used with any pulp or fiber stock normally used in the manufacture of paper, paperboard and the like. For example, the modified vermiculite may be added to wood pulp stock so as to control the porosity of the paper for such uses as vacuum cleaner bags. In the use of the modified vermiculite in the paper making process the material also functions as a dispersant for the fibers. The modified vermiculite may be added to the pulp stock as used in the production of heat-resistant paper for packaging such as the so-called ovenable paperboard. The vermiculite not only imparts a heat-resistant property but also imparts a decorative metallic appearance to the paperboard. Additional heat resistance may be imparted by high temperature coatings.

Disadvantages in the use of "loose fill" cellulose insulation has been the corrosive affect of the cellulosic insulation on piping and the separation of the flame retardants such as boric acid and borax. The modified vermiculite may be prepared by treating the exfoliated vermiculite with boric acid, borax and urea or phosphoric acid and, after the mechanical shearing, adjusting the pH to about 6.5 to 8.5 by the addition of an alkali. The resulting modified vermiculite is then added to the cellulosic material, such as, for example, hammer-milled newsprint. A slurry of the cellulosic material and modified vermiculite is dried and subsequently disintegrated into a desired form as by means of a dry blender. It is known that loose fill cellulosic insulation may be rendered fire-resistant or flame retardant by the use of borax and boric acid. The use of the modified vermiculite permits a reduction in the required amount of borax and boric acid as illustrated by the following example:

EXAMPLE 3

In preparing the samples of this example, hammer milled newsprint as used conventionally as a loose fill insulation was utilized. A stock solution was prepared containing 60 parts of boric acid and 40 parts of borax (sodium tetraborate decahydrate) per 1000 parts of water.

A control sample was prepared by slurrying 10 parts by weight of hammer milled newsprint in 250 parts by weight of tap water in a Waring blendor. The slurry was diluted with additional water to provide a slurry of 450 parts. The mass was stirred in the Waring blendor, medium speed, for about 2 minutes. The slurry was transferred to a polypropylene tray and dried. The dried material was fluffed in a laboratory dry blendor and identified as Sample D.

A second sample was prepared by slurrying 10 parts of hammer milled newsprint in 250 parts of tap water. A sufficient volume of the stock solution was added to the slurry to provide 1.2 parts of boric acid and 0.8 part of borax and the pH adjusted to pH 6.5–8.0 by addition of dilute caustic soda solution. Additional water was added to bring the total to 450 parts by weight. The mixture was stirred in a Waring blendor, medium speed, for about 2 minutes. The mixture was transferred to a polypropylene tray and dried. The dried material was fluffed in a laboratory dry blendor and identified as Sample E.

In the same manner a third sample was prepared, however, 0.5 part of urea was added to the slurry to replace the caustic soda of Sample E with the diluting water. The mixture after stirring was dried, fluffed and identified as Sample F.

In like manner another sample was prepared, however, only sufficient stock solution was added to provide 0.6 part of boric acid and 0.4 part of borax. With the dilution water, 0.5 part of urea and 0.5 part of modified vermiculite (Example 1) were added to the slurry. After stirring, the mixture was dried, fluffed and identified as Sample G.

A simple test was utilized in the evaluation of the fire retardant characteristic of the samples. In the test 3 grams of the fluffed samples were formed manually into a more or less semi-spherical mound, about 2.5 inch diameter, on a wire screen, ¼ inch openings. The upper half of the mound was carefully lifted manually and a lighted cigarette placed on the remaining material, the lighted end being positioned at about the center of the material. The lifted portion was then replaced over the base and burning cigarette. After burning had ceased (cessation of smoke), the lifted portion was removed and the area of the base portion which had burned or charred was noted as reported in the table which follows. The amount of boric acid, borax, urea and modified vermiculite (MV) is expressed in parts per 100 parts by weight of hammer milled newsprint.

TABLE II

|  | Boric acid | Borax | Urea | MV | Burn area |
|---|---|---|---|---|---|
| Sample D | — | — | — | — | 100% |
| Sample E | 12 | 8 | — | — | 50% |
| Sample F | 12 | 8 | 5 | — | 30% |
| Sample G | 6 | 4 | 5 | 5 | 30% |

In the case of the control newsprint, Sample D, the entire mound burned with flaming. Samples E, F and G smoked without flaming or flame propagation. In these samples the burning is arrested and extinguished by the added agents. The advantage in the use of the modified vermiculite is apparent since it permits a substantial reduction in the amount of boric acid and borax required to provide the desired fire resistant property to loose fill cellulose.

While loose fill cellulose insulation burned with a flame in the foregoing test (Sample D), the addition of 25%, by weight, of the modified vermiculite without the addition of the chemical retardants was effective in arresting flame propagation and reduced significantly the smouldering of the mass.

Although the modified vermiculite used in the example was prepared as in Example 1 using hydrochloric acid, it may be prepared by the use of other acids or acid salts as described above. It is not necessary that the modified vermiculite be recovered from the acidic slurry for use in preparing the loose fill cellulose insulation. In view of the fact that boric acid, borates and phosphates contribute fire retardant properties, the modified vermiculite is preferably prepared using aqueous solutions of boric acid, phosphoric acid or acid salts of phosphoric acid. Following the mild shearing action, the pH of the aqueous slurry may be neutralized (pH 6.5-8.0) by the addition of an alkali such as sodium hydroxide or urea, urea also contributing to the fire retardant properties of the final product. The amount of the fire retardants in the modified vermiculite slurry is adjusted to provide the required quantities of these ingredients to be added to the loose fill cellulosic insulation. The fibers may be slurried in the modified vermiculite slurry or a slurry of the fibers may be formed and the two slurries mixed.

Although the foregoing example describes the preparation of fire retardant loose fill cellulosic insulation by a wet method, a so-called dry method is equally applicable. The flame retardants may be dissolved in a suitable aqueous medium or in an aqueous emulsion or suspension of a binder, the modified vermiculite being slurried in the aqueous medium. For example, the binder may consist of a vinyl acetate-acrylic copolymer suspension in water. The aqueous medium containing these constitutes is sprayed into a chamber while the cellulosic fibers, wood pulp, hammer milled newsprint and the like, are blown simultaneously into the atomized liquid fog or mist. The fibers obviously pick up the liquid containing the fire retardants. The coated fibers are allowed to fall onto a suitable collector such as a screen which may be continuously passed through the chamber. Preferably, the air or gas used to atomize the liquid and to blow the fibers may be heated to aid in the drying of the collected fiber mass.

One of the conventional methods for the preparation of loose fill cellulose insulation is to supply newsprint to a hammer mill. The hammer milled newsprint and the fire retarding agents such as boric acid and borax in dry form are supplied to a second hammer mill wherein the materials are blended. The modified, heat exfoliated vermilulite, prepared as described herein, in dry particulate form may be added with the other fire retardants. Preferably, the fire retardants are dissolved in water and the modified vermiculite is slurried in the solution, or the fire retardants are dissolved in an aqueous suspension of a binder and the modified vermiculite in particulate form is slurried in the suspension. The resulting mixture is sprayed into the mass of hammer milled newsprint as the newsprint is discharge from a hammer mill. Alternatively, a so-called dual gun spray may be used wherein the hammer milled newsprint is blown through a nozzle while the liquid mixture is sprayed through a second nozzle.

The loose fill cellulose insulation may contain from about 4 to 10, preferably 6, parts of boric acid, from about 2 to 8, preferably 4, parts of borax, from about 3 to 9, preferably 5, parts of urea and from about 2 to 25, preferably at least 5, parts of the modified vermiculite per 100 parts of cellulose fiber. The amount of urea is sufficient to neutralize the acidity of the boric acid, but since it contributes to the fire retardant properties, may be in excess of that required for neutralization. In lieu of urea, an alkali, such as, for example, caustic soda, soda ash and the like, may be used as the neutralizing agent.

The modified vermiculite of this invention has a sheet forming characteristic which is not possessed by non-heat exfoliated vermiculite subjected to the chemical-mechanical treatment. In the preparation of the fire retardant loose fill insulation, the modified vermiculite forms a secure bond with the fibers. When dry fibers treated with the modified vermiculite, as described above by either a wet or dry process, are shaken on a screen, no modified vermiculite particles become dislodged. On the other hand, fibers treated with non-heat exfoliated vermiculite subjected to the chemical-mechanical treatment when shaken exhibit a dislodging of the vermiculite particles.

The modified vermiculite is useful in combination with natural and synthetic polymeric materials. The combination may be in the form of a coating composition, such as, for example, a paint, lacquer, vinyl and acrylic latexes and the like. In the combination with a natural polymeric material, such as, for example, cellulose in fiber or film form, wood fibers, regenerated cellulose fibers, collagen and the like, the modified vermiculite particles are self adherent to the substrate. In the combination with synthetic thermoplastic and thermosetting polymeric materials, such as, for example, cellulose acetate, cellulose nitrate, nylon, polyesters, polyethylene, polypropylene, polyurethane, polystyrene, synthetic rubbers and the like, the modified vermiculite particles are self adherent to the material when applied as a coating. Alternatively, the particles may be mixed into the polymeric material prior to shaping the polymer into the desired shaped structure. In the case of gelatin, the particles may be used as a self adherent coating or may be mixed into a solution or dispersion of gelatin prior to shaping into a desired structure.

In the coating compositions, the groups of platelets behave in a manner similar to metal flakes in the so-called metallized paints and enamels. After application to a substrate, the groups of platelets assume a position parallel to the surface of the substrate in a manner similar to aluminum flakes in the well known aluminum paint. Depending upon the quantity of modified vermiculite particles incorporated in the coating and in the polymeric material prior to shaping, the coating or the shaped polymeric structure will exhibit a metallic appearance (high loading) or a flaked appearance (low loading). The amount of particles added to the coating compositions and the polymeric materials may vary from about 1 to 50%, by weight, of the film forming constituent in the coating composition or of the polymeric material. Coating compositions such as conventional latex type paints containing the high proportions of modified vermiculite particles may be used as fire retardant acoustic coatings.

Where it is desired that the polymeric material structure have fire retardant and smoke suppressing characteristics, the amount of conventional substances, such as boric acid and borax, added to the polymeric may be substantially reduced by also incorporating the modified vermiculite particles in the polymeric material. In such instances, the modified vermiculite particles may also serve as a reinforcing agent.

The modified vermiculite particles may be combined with or coated with film forming clays such as montmorillonite, and with various metal oxides, such as, for example, aluminum oxide ($Al_2O_3$), antimony oxide ($Sb_2O_2$), titanium oxide ($TiO_2$) and the like. Such combination products are particularly suited for use in manufacturing flameproof structures, such as, for example, papers, synthetic polymer fibers, films, foams and the like. The modified vermiculite particles may be coated with a film forming clay such as montmorillonite by slurrying the particles in a water suspension of the clay and recovering coated particles by spray drying the slurry. In preparing the oxide coated particles, the particles may be slurried in an aqueous solution of the metal salt such as titanium sulfate and the titanium oxide formed by the addition of ammonium hydroxide in an amount sufficient to raise the pH of the solution to about pH 8. The oxide deposits on the modified vermiculite particles. The amount of clay or oxide added to the modified vermiculite particles may vary from about 5% to 50% based on the weight of the particles. In producing a flameproof paper, for example, the coated particles are added to the paper pulp slurry in amounts varying from about 2 to 50%, based upon the dry weight of the pulp. In forming flameproof synthetic polymeric material structures, the coated particles are preferably mixed in a polymer melt, the melt cooled and converted into pellets. The pellets are then melted in an extruder and extruded to form a desired physical structure, or the pellets may be placed in a heated mold and the molten material subjected to pressure to form the desired structure. The added coated particles may constitute from about 2 to 50%, by weight, based on the polymeric materials.

The compatiblity of the modified vermiculite particles with varius polymeric materials may be improved by treating the particles with organo-silanes, organo-metallic compounds such as organotin and fatty acid derivatives such as stearates and the like.

It is common knowledge that the burning of cigarettes continues until all of the tobacco is consumed and this characteristic is responsible for untold numbers of fires and fire related deaths. Because of the characteristics of the modified vermiculite particles and the ability to combine the particles with film forming clays and with aluminum and titanium oxides, all of which are nontoxic and non-carcinogenic, the modified vermiculite particles and such particles combined with a clay, or aluminum oxide or titanium oxide are satisfactory in producing self-extinguishing cigarettes. The particulate material may be added to the shredded tobacco by blowing the particulate material into the conventional blendor used in blending the various shredded tobacco. The particles are self-adherent to the shredded tobacco as described in the production of fire retardant loose fill cellulose insulation. Depending upon the specific additive, uncoated or coated modified vermiculite particles, the additive should be present in amounts of from about 5 to 40% based on the weight of the tobacco.

The modified vermiculite is also compatible with proteinaceous materials such as gelatin. Immobilized enzyme structures consisting of gelatin films have a limited use because of low structural strength of the gelatin film although treated with cross linking agents such as formaldehyde. Tough, rubbery sheets insoluble in water may be produced by incorporating as high as 100 percent modified vermiculite (based on the weight of gelatin) in gelatin. The modified vermiculite may be slurried in a warm gelatin solution or the modified vermiculite may be slurried in hot water and the gelatin added while stirring to dissolve the gelatin. The liquid mass is cast in a suitable tray such as a polypropylene tray and air dried. The resulting film may be soaked in a solution of a cross linking agent to cross link the gelatin. For example, a solution of equal parts of isopropanol and water containing formaldehyde and adjusted to a pH of about 2-5 with hydrochloric acid may be used for treating a film of equal parts of gelatin and modified vermiculite. The film may be soaked in the solution for 2 or 3 hours followed by washing with water to remove excess formaldehyde. The film may then be soaked in an aqueous solution of glycerol to plasticize the film or sheet.

The modified vermiculite since it is non-toxic and non-carcinogenic is an excellent inert filler for use in the production of the various types of dog food products. Dog bones are formed from mixtures of various ingredients such as proteinaceous materials, cellulose fibers, flour, calcium phosphate, vitamins and a plasticizer such as glycerol, sorbitol, and the like. The protein may be derived from bovine lime splits, hide trimmings, pork skins, gelatin and the like. In the use of the hide materials, the materials are first comminuted and mixed with the other ingredients. The fibrous cellulose may consist of hemp, rayon, wood pulp, and the like. The specific ingredients and their relative proportions will be varied depending upon the specific type of product. The modified vermiculite is used as an inert filler and structural reenforcement which is compatible with the other ingredients. The desired materials are mixed in wet state in a suitable mixer such as a Hobart mixer. The moist or wet mixture may be extruded, cut to a desired size, dried and packaged. Alternatively, the mixture may be pressed into a desired configuration and dried. The amount of modified vermiculite may vary up to about 50%, preferably 5 to 10%, based on the total weight of the product.

The unique sheet forming property of the modified vermiculite particles render the particles particularly suitable in formulating defoliants. Conventional defoliants such as used in defoliating cotton plants, gauyule plants, sorghum and the like are mixtures of sodium chlorate, soda ash, urea and a surfactant in water. The solution is applied by spraying. The addition of modified vermiculite particles in amounts of from about 0.5 to 5%, by weight of the solution, forms a coating which is porous and self-adherent to the leaves. The self-adherent property increases the effectiveness of the sodium chlorate. For the use in defoliants, it is desirable to increase the mechanical shearing in the acidic medium to provide up to about 20% of the weight of the modified vermiculite of particles exhibiting a Tyndall affect.

What is claimed is:

1. An article of manufacture comprising a natural or synthetic polymeric material and a self adherent aqueous acidic modified, heat exfoliated hydrated magnesium aluminosilicate in particulate form consisting of groups of non-colloidal platelets capable of hydrogen bonding with hydrophilic materials and compatible with hydrophobic polymers and being further characterized in forming slurries in aqueous media, the slurries being non-sensitive to electrolytes and in forming separable, coherent, continuous sheets upon drying of the slurries in contact with a hydrophobic surface.

2. An article of manufacture as defined in claim 1 wherein the polymeric material is a natural polymeric material and the modified aluminosilicate particles are hydrogen bonded to the polymeric material.

3. An article of manufacture as defined in claim 2 wherein the polymeric material is cellulose.

4. An article of manufacture as defined in claim 2 wherein the polymeric material is fibrous cellulose.

5. An article of manufacture as defined in claim 2 wherein the polymeric material is fibrous cellulose in mat or sheet form.

6. An article of manufacture as defined in claim 2 wherein the polymeric material is fibrous cellulose and includes from about 4 to 10 parts boric acid, from about 2 to 8 parts borax, from about 3 to 9 parts urea and from about 2 to 25 parts modified aluminosilicate particles per 100 parts fibrous cellulose.

7. An article of manufacture as defined in claim 1 wherein the polymeric material is a synthetic polymeric material.

8. An article of manufacture as defined in claim 1 wherein the polymeric material is a natural proteinaceous material.

9. An article of manufacture as defined in claim 1 wherein the polymeric material is gelatin and the modified aluminosilicate particles are present in an amount up to about 100% by weight based upon the weight of the gelatin.

10. An article of manufacture as defined in claim 1 wherein the polymeric material is a natural proteinaceous material and that includes flour, cellulose fibers, and calcium phosphate and the modified particles are present in an amount up to about 50% by weight based upon the weight of the article.

11. An article of manufacture as defined in claim 1 that includes an aqueous solution of sodium chlorate and soda ash, the amount of modified aluminosilicate particles being present in an amount up to about 5% by weight based upon the weight of the solution.

12. An article of manufacture as defined in claim 1 that includes an aqueous liquid in which the polymeric material is dispersed.

13. An article of manufacture as defined in claim 1 that includes an organic liquid in which the polymeric material is dissolved.

14. An article of manufacture as defined in claim 2 wherein the polymeric material is tobacco.

15. An article of manufacture as defined in claim 1 wherein the modified aluminosilicate particles are combined with a metal oxide.

16. An article of manufacture as defined in claim 1 wherein the modified aluminosilicate particles are combined with aluminum oxide.

17. An article of manufacture as defined in claim 1 wherein the modified aluminosilicate particles are combined with titanium oxide.

18. An article of manufacture as defined in claim 1 wherein the modified aluminosilicate particles are combined with antimony oxide.

19. An article of manufacture as defined in claim 1 wherein the modified aluminosilicate particles are combined with an organosilane.

20. An article of manufacture as defined in claim 1 wherein the modified aluminosilicate particles are combined with an organo-metal compound.

* * * * *